United States Patent [19]

Sakai et al.

[11] 4,023,447

[45] May 17, 1977

[54] FLUID PRESSURE CONTROL SYSTEM FOR AUTOMATIC POWER TRANSMISSION

[76] Inventors: Toshimitsu Sakai, 48, Heiwa-cho 4-chome; Kagenori Fukumura, 8, Toyota-cho; Tadashi Saitou, 6, Ohbayashi-cho 8-chome, all of Toyota, Aichi, Japan

[22] Filed: Jan. 22, 1975

[21] Appl. No.: 543,121

[30] Foreign Application Priority Data

Feb. 12, 1974 Japan ............................ 49-16295

[52] U.S. Cl. ............................................. 74/869
[51] Int. Cl.² ........................................ B60K 23/02
[58] Field of Search .................... 74/865, 878, 869

[56] References Cited
UNITED STATES PATENTS 3,831,465  8/1974  Murakami ........................ 74/869

*Primary Examiner*—Samuel Scott
*Assistant Examiner*—Frank H. McKenzie, Jr.
*Attorney, Agent, or Firm*—Lane, Aitken, Dunner & Ziems

[57] ABSTRACT

A fluid pressure control system for automatic power transmissions including a source of fluid providing a controlled line pressure, a manual valve movable to a number of positions including range P (parking), range R (reverse), range N (neutral), range "3", range "2" and range "1" in the order mentioned for setting the transmission in a desired operational range and provided with at least three spaced lands. A unitary, first pressure regulator valve is provided which has at least two spaced valve lands and a fluid passage interconnecting the unitary, first pressure regulator valve and the manual valve. The fluid passage communicates with a fluid chamber provided between the valve lands of the unitary first pressure regulator valve. In the range P, one of the valve lands of the manual valve is adapted to cut the line pressure. In the range R, the aforementioned fluid passage is blocked by another of the valve lands of the manual valve. The fluid passage communicates with a fluid chamber provided between valve lands of the manual valve in the ranges of N, D, "3", "2" and "1".

16 Claims, 13 Drawing Figures

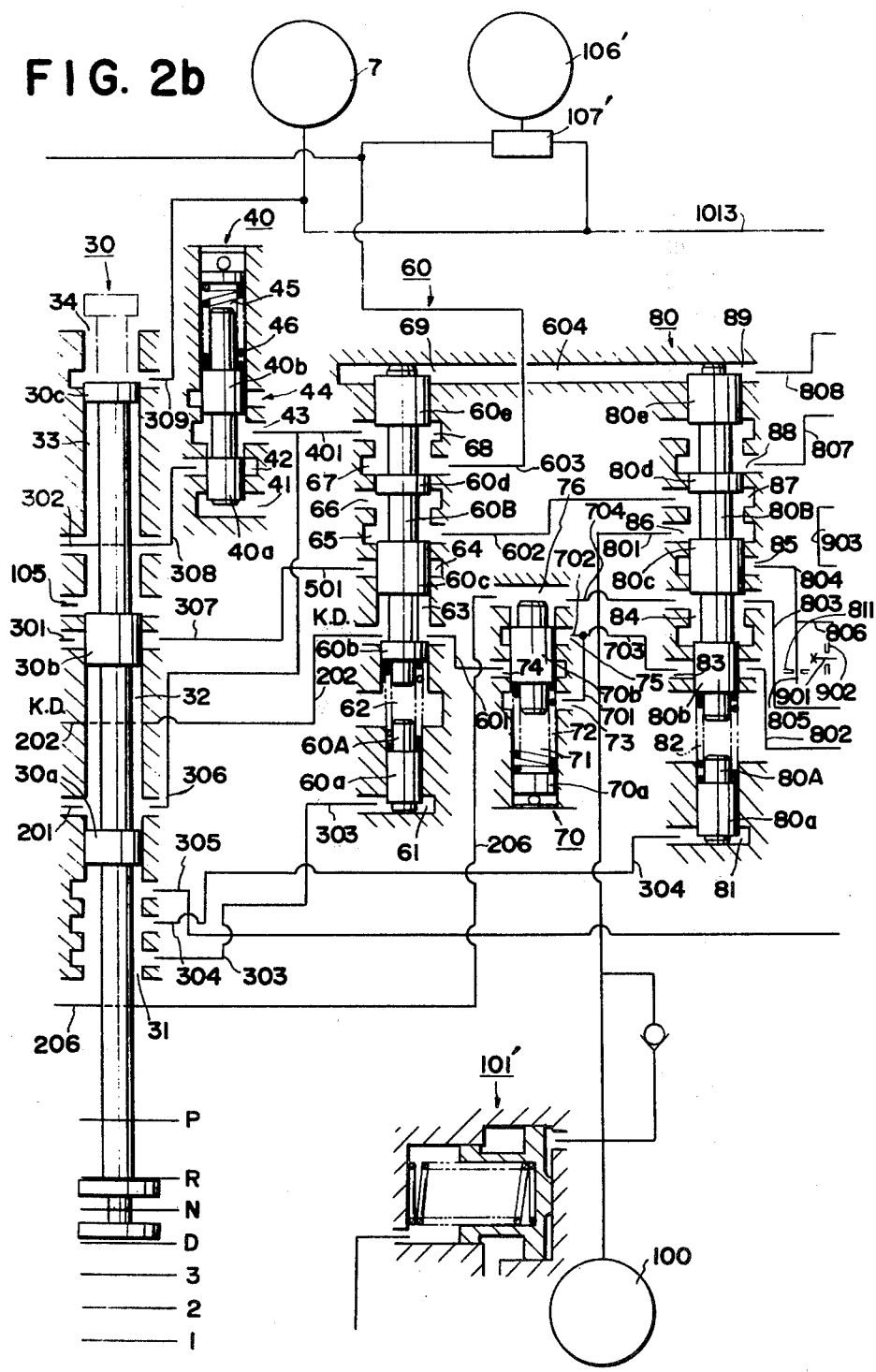

FLUID PRESSURE CONTROL SYSTEM FOR AUTOMATIC POWER TRANSMISSION

BACKGROUND OF THE INVENTION

This invention relates to a fluid pressure control system and, more particularly, to a fluid pressure control system for automotive, automatic power transmissions.

There have been known and in use a variety of pressure control systems for the automatic multi-ratio power transmissions of motor vehicles. A typical one of the prior-art fluid pressure control systems for the vehicular automatic power transmissions is described, for example, in U.S. Pat. No. 3,710,638. However, the existing control systems of this nature are invariably complicated in construction. The complication of construction is partly attributable to the provision of a detent pressure regulator valve separate from a first pressure regulator valve. The employment of a detent pressure regulator valve separate from the first pressure regulator valve results in a control system having an increased number of valves and a resulting higher production cost.

SUMMARY OF THE INVENTION

It is, therefore, an object of the present invention to provide a fluid pressure control system for automatic power transmissions of vehicles, which control system is relatively simple in construction.

It is another object of the invention to provide a control system of the above type which incorporates an improved design of a pressure regulator valve and a manual valve.

It is still another object of the present invention to provide a fluid pressure control system of the above type which has a reduced number of pressure control valves and wherein a first pressure regulator valve is adapted to act also as a detent pressure regulator valve.

It is a further object of the present invention to provide a fluid pressure control system of the above type which can perform required pressure control operations by means of a single first pressure regulator valve which generates a constant pressure.

It is a still further object of the present invention to provide a fluid pressure control system which is low in production cost.

In one particular form of the invention, the fluid pressure control system includes a manual valve movable to a number of positions including range P (parking), range R (reverse), range N (neutral), range "3", range "2" and range "1" in the order mentioned for setting the transmission in a desired operational range and provided with at least three spaced first, second and third valves lands. A unitary first pressure regulator valve is provided which has at least two spaced valve lands and a fluid passage interconnecting the unitary first pressure regulator valve and the manual valve. The fluid passage communicates with a fluid chamber provided between the valve lands of the unitary first pressure regulator valve. In the range P, the second valve land of the manual valve is adapted to cut the line pressure. In the range R, the aforementioned fluid passage is blocked by the first valve land of the manual valve. The fluid passage communicates with a fluid chamber provided between the first and second valve lands of the manual valve in the ranges of N, D, "3", "2" and "1".

The manual valve changes over the fluid pressure supply passage and is normally connected by a suitable link to a shift lever which is manually operated. As mentioned hereinbefore, the manual valve is provided with three spaced valve lands and movable to positions corresponding to ranges P (parking), R (reverse), N(neutral), D (drive), "3", "2" and "1" in response to movement of the shift lever for distributing the line pressure to predetermined fluid pressure supply passages. The first pressure regulator valve is preferably provided with two spaced valve lands and five fluid chambers including two drain chambers. One of these fluid chambers has inserted thereinto a spring means for urging one of the two valve lands in a downward direction for reducing the line pressure to a predetermined level by the force of the spring while supplying the detent pressure to other fluid passages.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in conjunction with the accompanying drawings wherein:

FIG. 2b is a diagrammatic view showing the control circuit portion B of FIG. 1;

DESCRIPTION OF THE PREFERRED EMBODIMENTS

Figure 1:
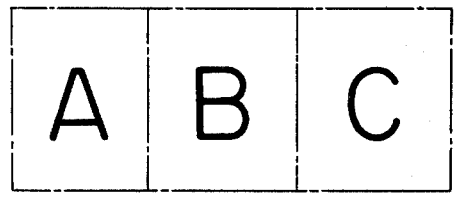
FIG. 1 is a diagram showing the connection of the fluid pressure control circuits portions A, B and C separately shown in FIGS. 2a to 2c.
Figure 2A:
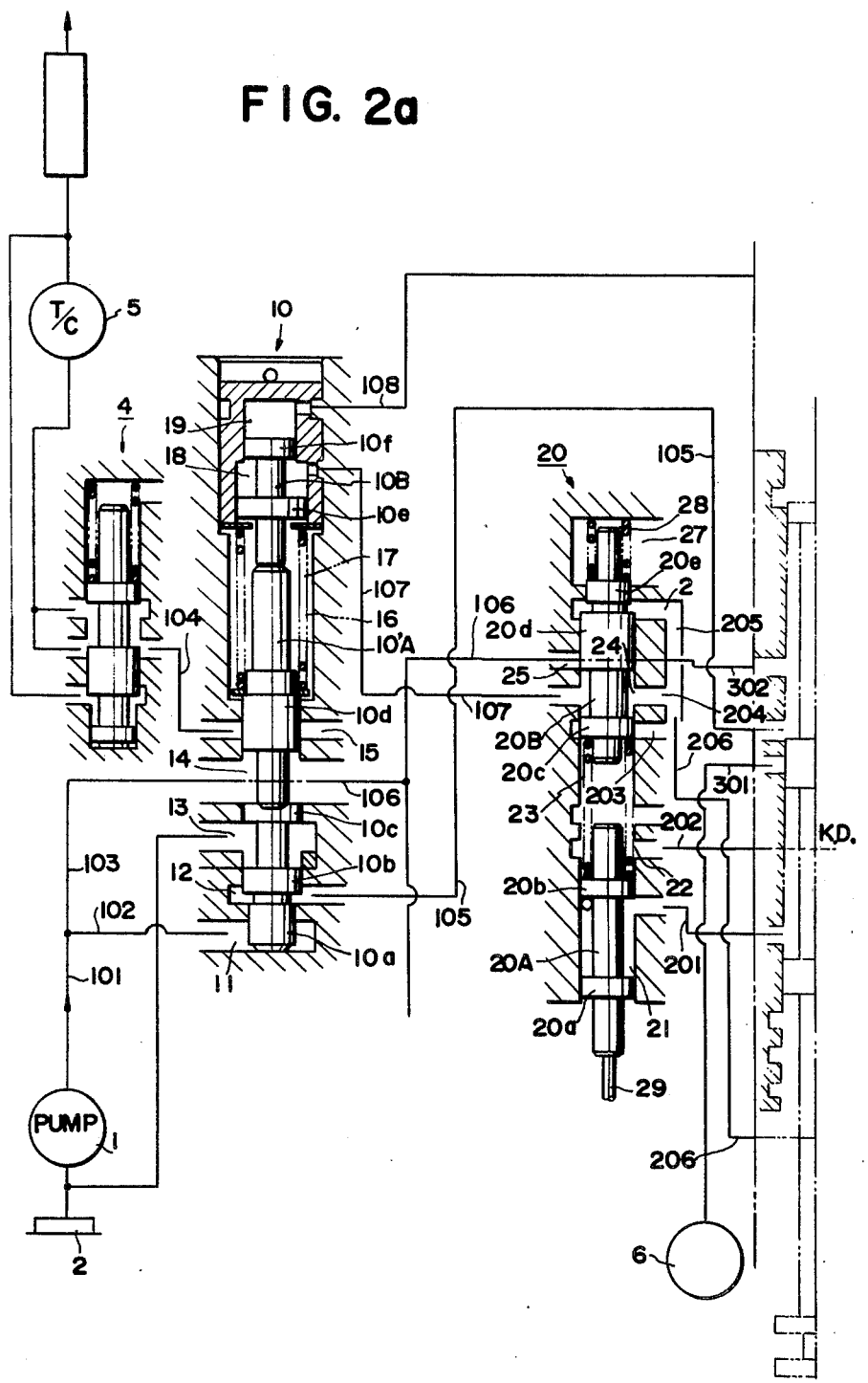
FIG. 2a is a diagrammatic view showing the control circuit portion A of FIG. 1.
Figure 2C:
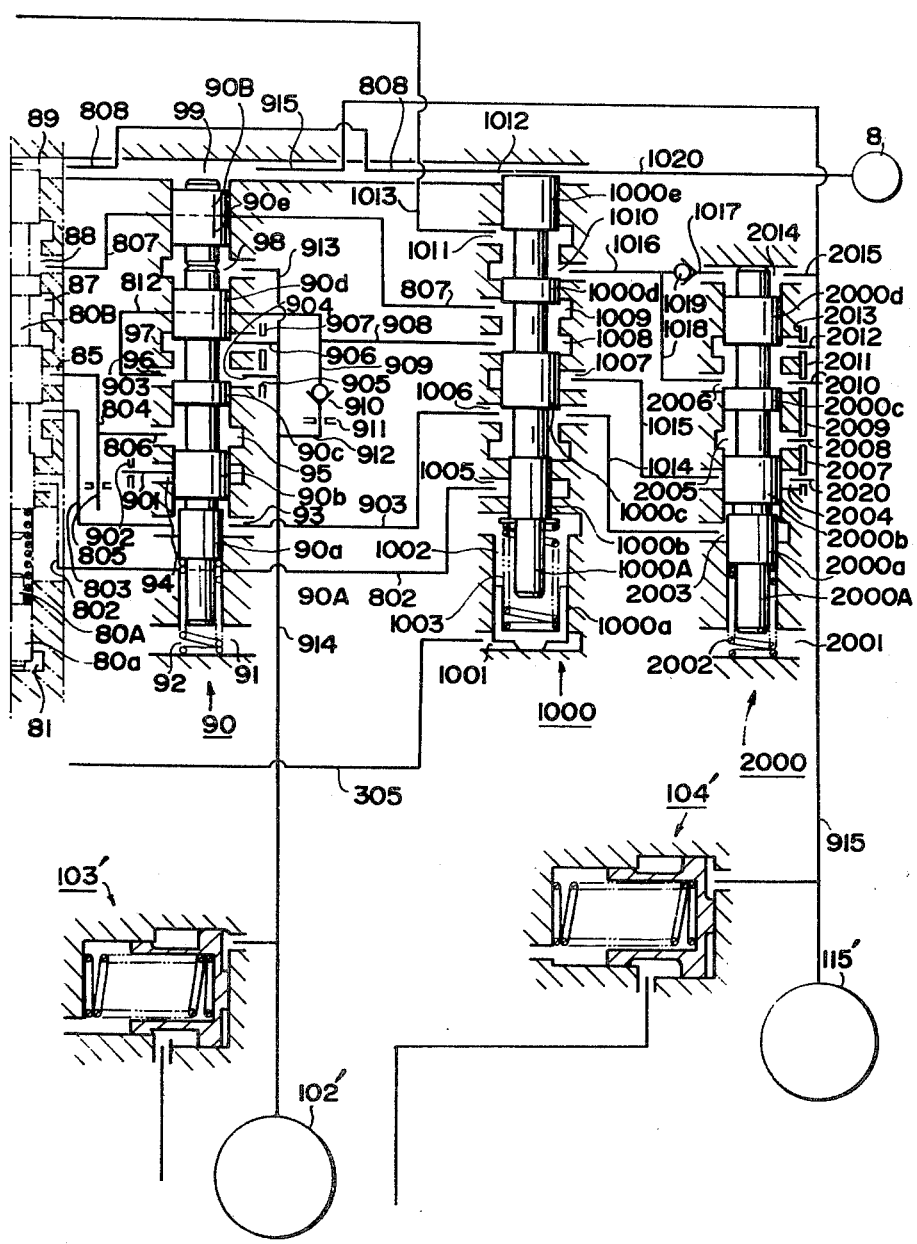
FIG. 2c is a diagrammatic view showing the control circuit portion C of FIG. 1.

Referring first to FIG. 1, there is shown in diagram the general construction of the automatic power transmission fluid pressure control system according to the present invention, which control system is divided for the convenience of illustration into portions A, B and C which are shown separately in FIGS. 2a, 2b and 2c, respectively. The details of the construction and operation of the control system of the invention will be discussed hereafter with reference to FIGS. 2 to 10.

Line Pressure Regulator Valve 10

Referring to FIG. 2a, the line pressure regulator valve 10 is adapted to regulate the pressure of the fluid supplied from a pump 1 to generate a controlled line pressure $P_L$. The line pressure regulator valve 10 includes a spool 10A with four spaced valve lands 10a to 10d, a spool 10B with two spaced valve lands 10e and 10f, and a number of fluid chambers between the respective valve lands just mentioned. As a matter of fact, the line pressure regulator valve 10 further includes a variety of other component parts, but they may be of the known construction and therefore no detailed description is given herein in this respect for the simplicity of explanation. The existing line pressure regulator valve can serve the purposes of the invention.

The fluid taken from a fluid reservoir 2 by the pump 1 is supplied to the fluid chamber 14 through conduits 101 and 103 and at the same time to the fluid chamber 11 through conduits or passages 101 and 102, respectively. The line pressure regulator valve 10 supplies to a fluid passage 106 line pressure $P_L$, by balancing two counteracting forces which work on the land 10a either to increase or reduce the output pressure of the line pressure regulator valve 10. The force which tends to increase the output pressure of the line pressure regulator valve 10 can be expressed by the following equation.

Pressure increasing force = force of spring 17 + (land 10e − land 10f) × throttle pressure $P_{th}$ + land 10f × line pressure $P_L$.

The fluid chamber 13 communicates with the fluid reservoir 2 to serve as a drain chamber. The fluid chamber 15 communicates through a passage 104 with a torque converter pressure regulator valve 4, which regulates the pressure of a lubricant oil to be fed to the torque converter in the known manner.

Throttle Valve 20

Referring to FIG. 2a, the throttle valve 20 is adapted to produce throttle pressure $P_{th}$ according to the throttle opening of the carburetor (not shown). The throttle valve 20 includes a first valve spool 20A with two spaced valve lands 20a and 20b and a second valve spool 20B with three spaced valve lands 20c, 20d and 20e. A spring 23 is mounted in an oil chamber 23 to urge the first valve spool 20A in a downward direction and the second valve spool 20B in an upward direction, as seen in FIG. 2a. On the other hand, a spring 28 mounted in a fluid chamber 27 urges the second valve spool 20B downwardly. The first valve spool 20A is associated with an accelerator pedal (not shown) of the vehicle by means of a rod member 29 or the like and is moved upwardly in proportion to the amount of depression of the accelerator pedal, also as seen in FIG. 2a. The line pressure $P_L$ is introduced into a fluid chamber 25 through passage 106. The throttle pressure $P_{th}$ is generated at the fluid chamber 24 in proportion to the throttle opening, by balancing two counteracting forces, that is to say, a pressure reducing force and a pressure increasing force. In this instance, the pressure reducing and increasing forces are expressed by the following equations.

Pressure reducing force = force of spring 28 in chamber 27 + (land 20d − land 20e) × $P_{th}$ Pressure increasing force = force of spring 23 (force urging first valve spool 20A upwardly + force urging first valve spool 20A downwardly)

The throttle pressure $P_{th}$ is supplied to the fluid chamber 18 of the line pressure regulator valve 10 through passage 107 which is led from the fluid chamber 24 and at the same time to valves 70, 80, 90, 1000, and 2000 which will be discussed hereinlater through passage 206.

At the time of kick-down, passage 201 which is led from the fluid chamber 21 communicates with passage 202 which is led from the fluid chamber 22, as indicated in FIG. 2a.

Passages 204, 205 and 206 are always in fluid communication with each other.

Manual Valve 30

As shown particularly in FIG. 2b, the manual valve 30 includes three spaced valve lands 30a, 30b and 30c. The manual valve 30 is operated by a driver to change over the fluid passages. For example, the manual valve 30 is connected to a shift lever (not shown), which is operated by a driver, by means of a suitable link (not shown) and selectively shifted to a position for range P (parking), R (reverse), N (neutral), D (drive), "3", "2", or "1" in accordance with the movement of the shift lever, thereby distributing the line pressure $P_L$ to the fluid passages of the respective range. The operations in the ranges P, R, N, D, "3", "2", "1" will be described in detail hereinlater.

The manual valve 30 is provided with fluid chambers 31, 32, 33 and 34 and, in the position shown in FIG. 2b, has the fluid chamber 31 communicated with passages 303, 304 and 305 which are in fluid communication with 1–2 shift valve 60, 2–3 shift valve 80 and 3–4 shift valve 1000, respectively. The chamber 32 communicates with a passage 201 which leads to the chamber 21 of the throttle valve 20 (FIG. 2a) and also with a conduit 306 which leads to fluid chambers 43 and 68 of a first pressure regulator valve 40 and a 1–2 shift valve 60 which will be discussed hereinlater. Furthermore, the chamber 33 of the manual valve 30 communicates with a passage 105 which leads to the fluid chamber 12 of the line pressure regulator valve 10 (FIG. 2a) and at the same time with passage 302 which leads to the fluid chamber 25 of the throttle valve 20 and with fluid chamber 42 of the first pressure regulator valve 40, while the fluid chamber 34 communicates with passage 309 which in turn communicates with fluid chamber 1011 of the 3–4 shift valve 1000 and a reverse brake 7, which 3–4 shift valve 1000 and reverse brake 7 will appear in greater detail hereinlater. In the position shown in FIG. 2b, the passage 301 (FIG. 2a) which leads to a front clutch 6 and the passage 307 which leads to the fluid chamber 64 of the 1–2 shift valve 60 are blocked. The operations performed by the manual valve 30 will be described in greater detail hereinlater with reference to FIGS. 4 to 10.

First Pressure Regulator Valve 40

As shown in FIG. 2b, the first pressure regulator valve 40 is provided with two spaced valve lands 40a and 40b and five oil chambers 41 to 45. The oil chambers 41 and 44 are provided for draining purposes. A spring 46 is inserted into the oil chamber 45 for urging the valve land 40b in a downward direction, as seen in FIG. 2b. The valve 40 functions to reduce the line pressure $P_L$ to a predetermined constant level and supplies a detent pressure to passages 306 and 401, respectively.

1–2 Shift Valve 60

The 1–2 shift valve 60 includes a first valve 60A with a valve land 60a and a second valve 60B with four spaced valve lands 60b, 60c, 60d and 60e. A spring 62 is interposed between the first and second valves 60A and 60B to urge the first valve 60A in a downward direction and the second valve 60B in an upward direction, respectively, as seen in the drawing. The chamber 61 is supplied with fluid pressure through passage 303 only in the range "1" (which will be explained hereinlater). At the time of kick-down, the fluid pressure is admitted to the chamber 63 through passage 202 and urges the second valve 60B upwardly due to a differential area existing between the lands 60c and 60b (60c - 60b). The fluid pressure regulated by the first pressure regulator valve 40 is introduced into the chamber 68 of the 1-2 shift valve 60 through the conduit 401. With a high governor pressure $P_{go}$, the passage 401 which leads to the chamber 68 and the passage 603 which leads from the chamber 67 are blocked by the land 60e, while the passages 501 and 602 are communicated with each other through the chamber 64.

Throttle Modulator Valve 70

The throttle modulator valve 70 is provided with two spaced valve lands 70a and 70b. The valve land 70a is biased upwardly by means of a spring 72 which is inserted into a fluid chamber 71. The chamber 76 is supplied with the throttle pressure $P_{th}$ through passage 206.

Figure 3:
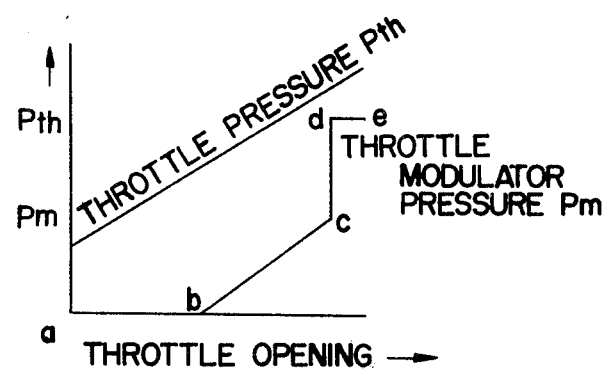
FIG. 3 is a graphic representation of the relations between throttle opening; throttle pressure and throttle modulator pressure.

With a small throttle opening, that is to say, in the range between a and b in FIG. 3, the valve land 70b blocks the communication between passages 206 and 702, with the result that no throttle modulator pressure $P_m$ is generated. When the throttle opening is widened to a ceratin degree, for example, to a point between b and c in FIG. 3, the valve land 70b is pushed down to a position balancing with the force of the spring 72 to establish in the passage 703 a throttle modulator pressure $P_m$ which is proportional to the throttle opening. When the throttle opening is further widened into an almost "full open" state, that is to say, to a point between d and e in FIG. 3, the detent pressure from the first pressure regulator valve 40 is admitted to the passage, so that the passages 202 and 703 are communicated with each other through the fluid chamber 63 and passage 601 of the valve 60 and the chambers 74 and 73 and the passage 701 of the valve 70, thereby admitting the detent pressure into the conduit 703. As a result, the throttle modulator pressure is abruptly increased from c to d as shown in FIG. 3. The throttle modulator pressure $P_m$ gives hysteresis effects at the time of upshifts and downshifts.

In FIG. 2b, the fluid chamber 71 is in communication with the passage 703 through the chamber 73 and conduit 701.

2-3 Shift Valve 80

The 2-3 shift valve 80 includes a first valve spool 80A with a valve land 80a and a second valve spool 80B with four spaced valve lands 80b, 80c, 80d and 80e. The spring 82 which is interposed between the first and second valve spools 80A and 80B biases the first valve spool 80A in a downward direction and the second valve spool 80B in an upward direction, as seen in FIG. 2b. The lowermost fluid chamber 81 of the 2-3 shift valve 80 communicates with the chamber 31 of the manual valve 30 through passage 304. On the other hand, the uppermost fluid chamber 89 communicates with the fluid chamber 69 of the 1-2 shift valve 80 through passage 604 and at the same time with the governor 8 (FIG. 2c) through passage 808. Therefore, the governor pressure $P_{go}$ is supplied to the fluid chamber 89 through passage 808 to push down the valve land 80e.

In the second speed operation, the throttle pressure $P_{th}$ admitted to the fluid chamber 84 through the passage 704 acts to push up the second valve body 80B due to the differential area of the valve lands 80c and 80b (80c - 80b).

In the third speed operation, the throttle modulator pressure $P_m$ which is lower than the throttle pressure $P_{th}$ and which is admitted to the fluid chamber 83 through passage 703 acts on the valve body according to the differential area (80c - 80b).

On the other hand, in the ranges "1" and "2", the detent pressure is supplied to the chamber 81 through the aforementioned passage 304 and pushes up the land 80a to maintain the valve in the low-speed position.

In the position shown in FIG. 2b, the passage 801, which leads to the second brake 100 and the second accumulator 101', communicates with the passage 602 which leads to the chamber 65 and 66 of the 1-2 shift valve 60, through the chambers 86 and 87 of the 2-3 shift valve 80, while the fluid chamber 85, which communicates with the passage 804, is blocked by the valve land 80c. The passage 804 is connected to two separate passages 805 and 806, and the fluid chamber 83 communicates with the passage 802.

2-3 Shift Timing Valve 90

Referring now to FIG. 2c, the 2-3 shift timing valve 90 includes a first spool 90A with four spaced valve lands 90a, 90b, 90c and 90d and a second spool 90B with a valve land 90e. The drain chamber 91 at the lower end of the valve, as seen in the drawing, has inserted thereinto a spring 92 for biasing the land 90a upwardly. The uppermost fluid chamber 99 is supplied with the rear clutch pressure through passage 915. The function of the 2-3 shift timing valve 90 is to control the apply-pressure to be fed to the third brake 102' and the release-pressure of the second brake 100 for suppressing the shocks which would otherwise be caused at the time of gear shifts. For example, in the case of upshift from the second to the third speed, the third brake applying line pressure is admitted to the chamber 96 through the passages 807, 908 and 903. In this instance, the fluid chamber 99 is not supplied with the rear clutch pressure, so that the valve spool 90A is pushed upwardly by the action of the spring 92. As a result, the passage 903 communicates with the passages 904 and 906 through the chambers 96 and 97, respectively, and the line pressure $P_L$ is communicated with the third brake 102' through the orifices 905 and 907 and passage 914 to apply the third brake 102'. At the same time, the line pressure $P_L$ is supplied to chamber 98 through passage 913 to act on the valve land 90d. As a result, the valve land 90d is moved in a downward direction to block the passage 906 and the fluid is allowed to flow only through an orifice 905, so that the amount of the line pressure to the third brake 102' is reduced. The line pressure $P_L$ to the third brake 102' therefore rises very swiftly and, after engagement of the brake, increases gradually.

In releasing the second brake 100 (FIG. 2b), the fluid pressure is drained only through the orifice 811 in the passage 805 (FIG. 2b) when the third brake pressure is not raised so much. However, when the third pressure has been increased to a high level, the passages 806 and 901 are brought into fluid communication with each other to drain quickly the second brake pressure simultaneously through both of the passages 805 and 901.

The passage 901 is in fluid communication with the chamber 94 and provided with an orifice 902. The port 93 communicates with passages 803 and 903. The passage 914 leads to the third brake 102' and the third accumulator 103' and communicates with the passage 802 through the passage 909, check valve 910, orifice 911 and passages 912. The passage 812 also communicates with the passage 908, which is in fluid communication with the 3-4 shift valve 1000 which will be described hereinlater.

3-4 Shift Valve 1000

The 3-4 shift valve 1000 includes a plug 1000a, a spool 1000A with four spaced valve lands 1000b, 1000c, 1000d and 1000e, and a spring 1003 interposed between the plug 1000a and the spool 1000A. The valve land 1000e receives the governor pressure $P_{go}$ through the passage 1020. The spool 1000A is urged in an upward direction by the action of the aforementioned spring 1003 which is inserted in a drain chamber 1002.

In the third speed operation, the 3-4 shift valve 1000 assumes the position shown, where the throttle pressure $P_{th}$ in the passage 903 is admitted into the fluid chamber 1006 and acts on the differential area of the lands 1000c and 1000b (1000c - 1000b) and the passages 807 and 908 communicate with each other through fluid chambers 1008 and 1009. In this instance, the passages 1013 and 1016 also communicate with each other through fluid chambers 1010 and 1011. The passage 1013 just mentioned communicates with the first brake 106' through a one-way valve 107' (FIG. 2b).

In the fourth speed operation, the throttle modulator pressure $P_m$ which is admitted into the fluid chamber 1005 through the passage 802 acts on the differential area of the valve lands 1000c and 1000b (1000c - 1000b) and gives hysteresis actions at the time of gear shifts. In this instance, the passages 807 and 1016 communicate with each other and at the same time the passage 908 communicates with the passage 1015 through the fluid chambers 1008 and 1007. The throttle pressure passages 903 and 1014 are blocked by the land 1000c.

The fluid chamber 1001 is held in fluid communication with the passage 305.

3-4 Shift Timing Valve 2000

The 3-4 shift timing valve 2000 includes a spool 2000A with four spaced valve lands 2000a, 2000b, 2000c and 2000d. A spring 2002 is inserted in a drain chamber 2001 for urging the spool 2000A in an upward direction as seen in the drawing. The throttle pressure $P_{th}$ in the passage 1014 is admitted into the fluid chamber 2003 and works on the differential area of the valve lands 2000b and 2000a (2000b - 2000a) to push up the spool 2000A. At the time of upshift from the third to the fourth speed ratio, the line pressure $P_L$ is supplied to the fluid chamber 2006 of the 3-4 shift timing valve 2000 through the passages 1016 and 1018. In this instance, if the rear clutch pressure is small, the passage 1018 communicates with passages 2012 and 2010 to supply the fluid pressure quickly to the rear clutch 115' through the passage 915. When the rear clutch pressure acting on the valve land 2000d becomes greater than the combined force of (force of spring 2002 + throttle pressure $P_{th}$ × differential area of lands 2000b and 2000a), the spool 2000A is moved downwardly to block the flow of the fluid pressure into the passage 2012, bringing the rear clutch gradually into engagement.

The release of the third brake pressure is attained by draining the braking pressure through the passage 914 which leads from the third brake 102 and through passage 912, orifice 911, check valve 910, passages 909 and 908, fluid chambers 1008 and 1007 and passage 1015 to passage 2004. When the rear clutch pressure is raised, the spool 2000A is moved to drain the third brake pressure quickly through both the passage 2008 and the chamber 2005. The passage 2008 just mentioned communicates with the chamber 2005 and has an orifice 2007. The passages 2010 and 2012 are provided with orifices 2011 and 2013, respectively.

At the time of downshift from the fourth to the third speed ratio, the rear clutch pressure is drained from the manual valve through the passage 915, passage 2015, chamber 2014, passage 1017, check valve 1019, passage 1016, chambers 1010 and 1011, passage 1013 and so on.

The passage 915 is also in fluid communication with the fourth accumulator 104.

Description is now directed to the operation of the manual valve 30 which forms a main part of the instant invention and of the first pressure regulator valve 40 and other related component parts, with reference to FIGS. 4 to 10.

Range P

Figure 4:
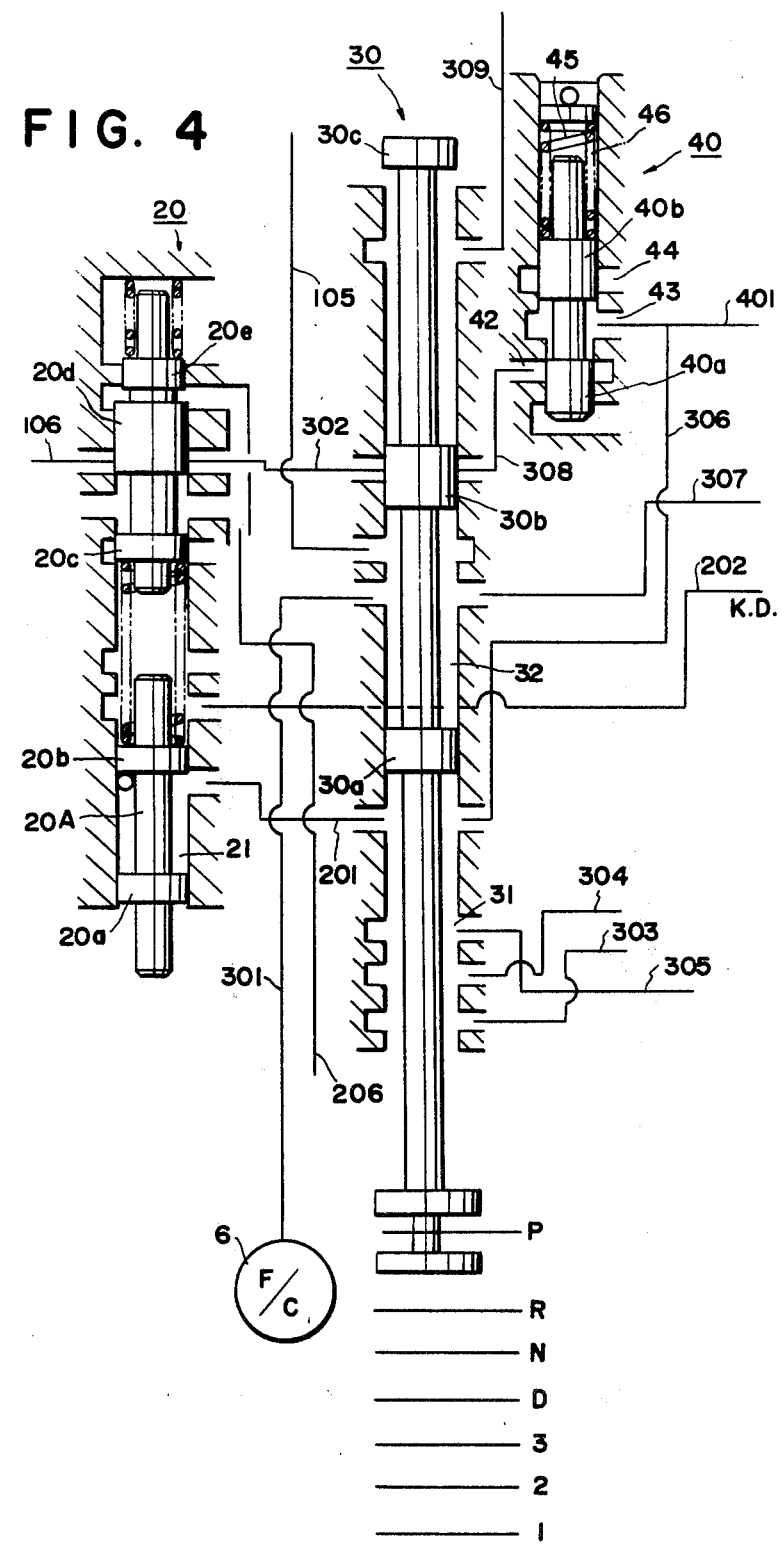
FIGS. 4 to 10 are diagrammatic views showing various operative modes of the pressure control device according to the instant invention.

As shown particularly in FIG. 4, when the manual valve 30 is set in the range P position, the communication between the passages 302 and 308 are blocked by the valve land 30b to cut the supply of the line pressure $P_L$, with the result that all the engaging friction elements downstream of the passage 308 are held released.

Range R

Figure 5:
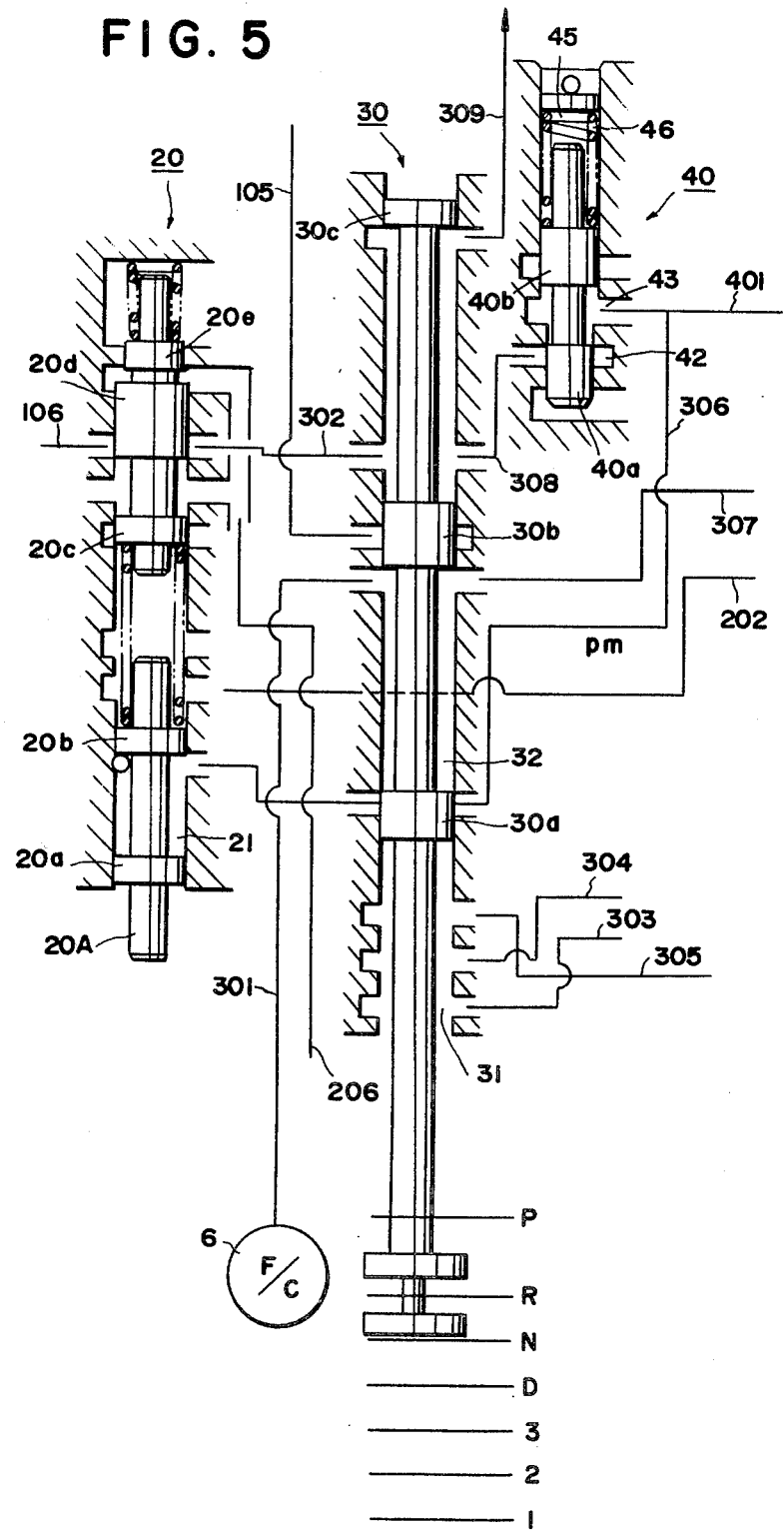

As shown particularly in FIG. 5, when the manual valve 30 is shifted to the range R (reverse) position, the passages 302 and 308 as well as the passage 302 and 309 are brought into fluid communication with each other. The line pressure $P_L$ is therefore supplied through the passage 309 to the reverse brake 7 (FIG. 2b) to apply the brake.

On the other hand, the line pressure $P_L$ in the passage 309 is supplied to the first brake 106' through the one-way valve 107' to engage the brake 106' and, at the same time, to the fluid chamber 1011 of the 3-4 shift valve 1000 through the passage 1013. In this instance, as the governor pressure $P_{go}$ acting on the 3-4 shift valve 1000 is small, the valve spool 1000A is urged upwardly by the action of the spring 1003, into the position shown in FIG. 2c. As a result, the passages 1013 and 1016 are brought into fluid communication with each other to supply the line pressure $P_L$ to the fluid chamber 2006 through the passage 1018 which is connected to the passage 1016. Since the valve spool 2000A of the 3-4 shift valve 2000 is biased by the action of the spring 2002, the passage 1018 communicates with the passages 2010 and 2012 through the fluid chamber 2006 and then with the rear clutch 115' through the passages 2010 and 2012 just mentioned, thereby engaging the rear clutch 115'.

The passage 302 communicates with the passage 308 and 309, respectively, and the line pressure $P_L$ of the passage 308 is reduced by the first pressure valve 40 while the detent pressure is supplied to the passages 306 and 401. The detent pressure of the passage 306 is blocked by the valve land 30a and introduced to the passage 603, through the 1–2 shift valve 60 of the passage 401. The fluid pressure to the first brake 106' is branched and supplied to the fluid chamber 19 on the pressure-increasing side of the line pressure regulator valve 10. On the other hand, the line pressure $P_L$ of the passage 309 is supplied to the reverse brake 7 and the first brake 106' to bring the same into engagement.

Range N

Figure 6:
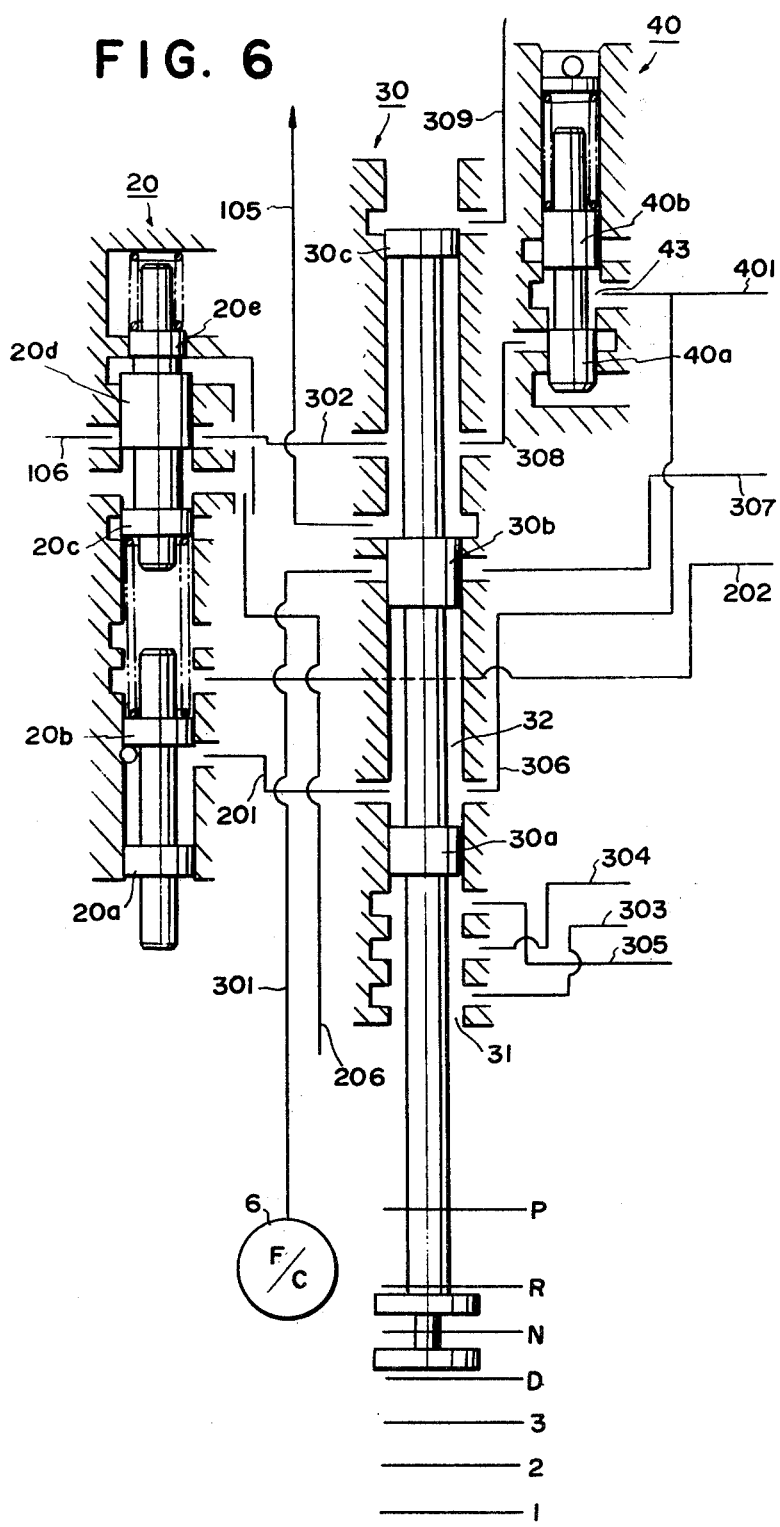

As shown particularly in FIG. 6, the passage 302 communicates with the passages 308 and 105 and the line pressure $P_L$ of the passage 105 is supplied to the chamber 12 of the line pressure regulator valve 10 to reduce the line pressure $P_L$. On the other hand, the line pressure in the passage 308 is reduced by the first pressure regulator valve 40 and engages only the first brake 106 through the passage 401, 1–2 shift valve 60 and passage 603, with the other clutch brakes held in released state. The first regulator valve 40 regulates the pressure by balancing the two counteracting forces, that is to say, the force of the spring 46 and the line pressure acting on the differential area of the valve lands 40b and 40a (40b - 40a). The detent pressure is led to the throttle valve 20 through the passages 306 and 201.

Range D

Figure 7:
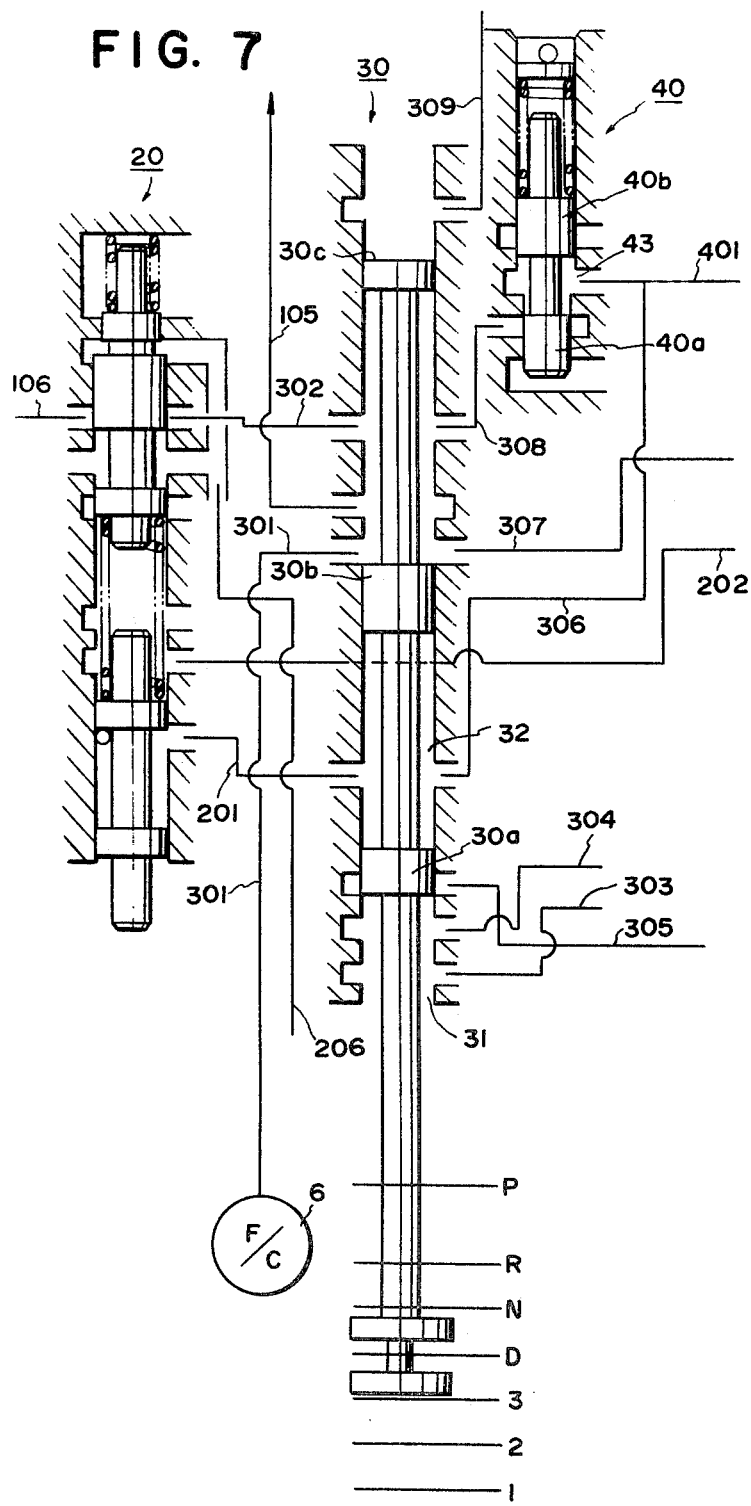

As shown particularly in FIG. 7, when the manual valve 30 is shifted to the range D position, the passage 302 communicates with passages 105, 301, 307 and 308. As a result, the line pressure $P_L$ is supplied to the passage 301 to engage the front clutch 6. The line pressure of the passage 307 is fed to the 1–2 shift valve 60. On the other hand, the detent pressure is sent to the throttle valve 20 through the passage 306, chamber 32 and passage 201 and to the chamber 68 of the 1–2 shift valve 60 through the passage 401. The operation in the range D will be described in greater detail hereafter with reference to FIGS. 2a to 2c.

Range D, First

The line pressure $P_L$ which has been regulated by the line pressure regulator valve 10 in the forward drive, constantly holds the manual valve 30 in fluid communication with the passage 301 which leads to the front clutch 6, through the passages 106 and 302, thereby to engage the front clutch 6, while the line pressure $P_L$ is admitted into the chamber 42 of the first pressure regulator valve 40 through the passage 308. The first pressure regulator valve 40 regulates the fluid pressure by means of the two opposing forces acting on the valve, that is to say, the force of the spring 45 and the line pressure acting on the differential area of the valve lands 40b and 40a (40b - 40a) and supplies the regulated pressure to the passages 401 and 306. The 1–2 shift valve 60 receives the governor pressure $P_{go}$ in its fluid chamber 69 through the passage 604 but the pressure $P_{go}$ which is proportional to the vehicle speed is still very small in the first speed, so that the spool 60B of the 1–2 shift valve 60 is urged upwardly by the action of the spring 62, communicating with the passages 401 and 603 with each other to supply the line pressure $P_L$ to the first brake 106 for engagement thereof.

Range D, Second

The front clutch 6 is left in the applied state and the line pressure $P_L$ is admitted to the fluid chamber 64 of the 1–2 shift valve 60 through the passages 302, 307 and 501. The vehicle speed becomes higher in the second speed operation, so that the governor pressure $P_{go}$ acting on the valve land 60e overcomes the force of the spring 62 and brings the passages 501 and 602 into fluid communication with each other to supply the line pressure $P_L$ to the 2–3 shift valve 80. The 2–3 shift valve 80 is moved to balance the governor pressure $P_{go}$ acting on the valve land 80e with the combined three forces of the force acting on the differential area (80b - 80c) plus the force of the spring 82 plus the force of the line pressure $P_L$ acting on the valve land 80a (only in the ranges "2" and "1").

In the second speed operation, the governor pressure $P_{go}$ is not so high and therefore the passages 602 and 801 are brought into fluid communication with each other to supply the line pressure $P_L$ to the second brake 100 for engagement thereof.

On the other hand, the first brake 106' which is maintained in an engaged state in the first gear shift has its pressure exhausted from the drain chamber 66 through the passage 603.

Range D, Third

The front clutch 6 is maintained in the applied state and the line pressure $P_L$ is supplied to the third brake 102' through the passages 501, 602, 807, 908 and 914 for engaging the third brake 102'. While, the fluid pressure which has been holding the second brake 100 in the engaged state is drained by communication of the passages 801 and 804 to assume the state for the third speed.

Range D, Fourth

The front clutch 6 is maintained in the applied state and the 3–4 shift valve 1000 receives the governor pressure $P_{go}$ in the fluid chamber 1012 through the passage 1020, with the result that the force acting on the valve land 1000e becomes greater than the combined force of the throttle pressure $P_{th}$ acting on the differential area (1000c - 1000b) and the force of the spring 1003 and urges the spool 1000A downwardly to bring the passages 807 and 1016 into fluid communication with each other, allowing the line pressure $P_L$ to engage the rear clutch 115' through the passages 1018 and 915.

The fluid pressure which has been holding the third brake 102' in the engaged state is drained through the passage 914, orifice 911, one-way valve 910, passage 909, passage 908, passage 1015, and orifice 2007. The governor pressure $P_{go}$ acting on the land 1000e of the 3–4 shift valve therefore becomes greater and urges the spool 1000A downwardly to put the passages 908 and 1015 in communication with each other.

Range 3

The gear shifts are effected automatically between the first, second and third speed ratios but upshift to the fourth speed is disabled. The operations of the respective engaging or friction elements are the same as in the first, second and third speeds operations of the range D mentioned hereinabove.

Figure 8:
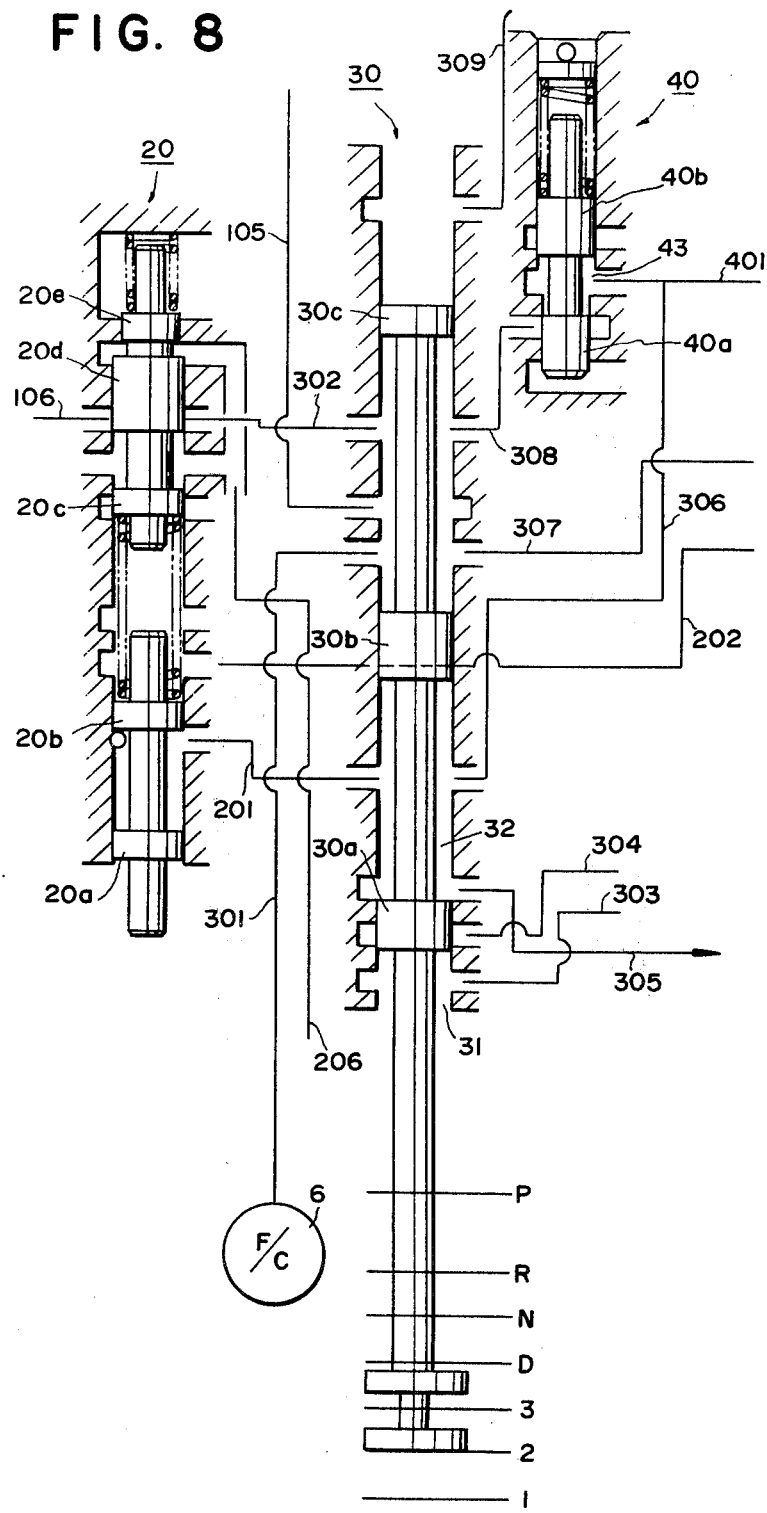

Referring to FIG. 8, the line pressure passages 105, 301, 302, 307 and 308 communicate with each other, while the detent pressure passage 201 communicates with passages 305 and 306. The detent pressure of the passage 305 is sent to the fluid chamber 1001 of the 3-4 shift valve 1000 and urges the valve spool 1000A upwardly through the plug 1000a to disable the upshift to the fourth speed.

Range 2

The gear shifts are effected automatically between the first and second speed ratios but upshift to the third or higher speed ratio is disabled, in the range 2. With the first speed ratio, the front clutch 6 and the first brake 106' are in the engaged state as in the first speed ratio of range D while other engaging elements are held in disengaged stated. With the second speed ratio, the front clutch 6 and the second brake 100 are in the engaged state but other engaging elements are held in disengaged state.

Figure 9:
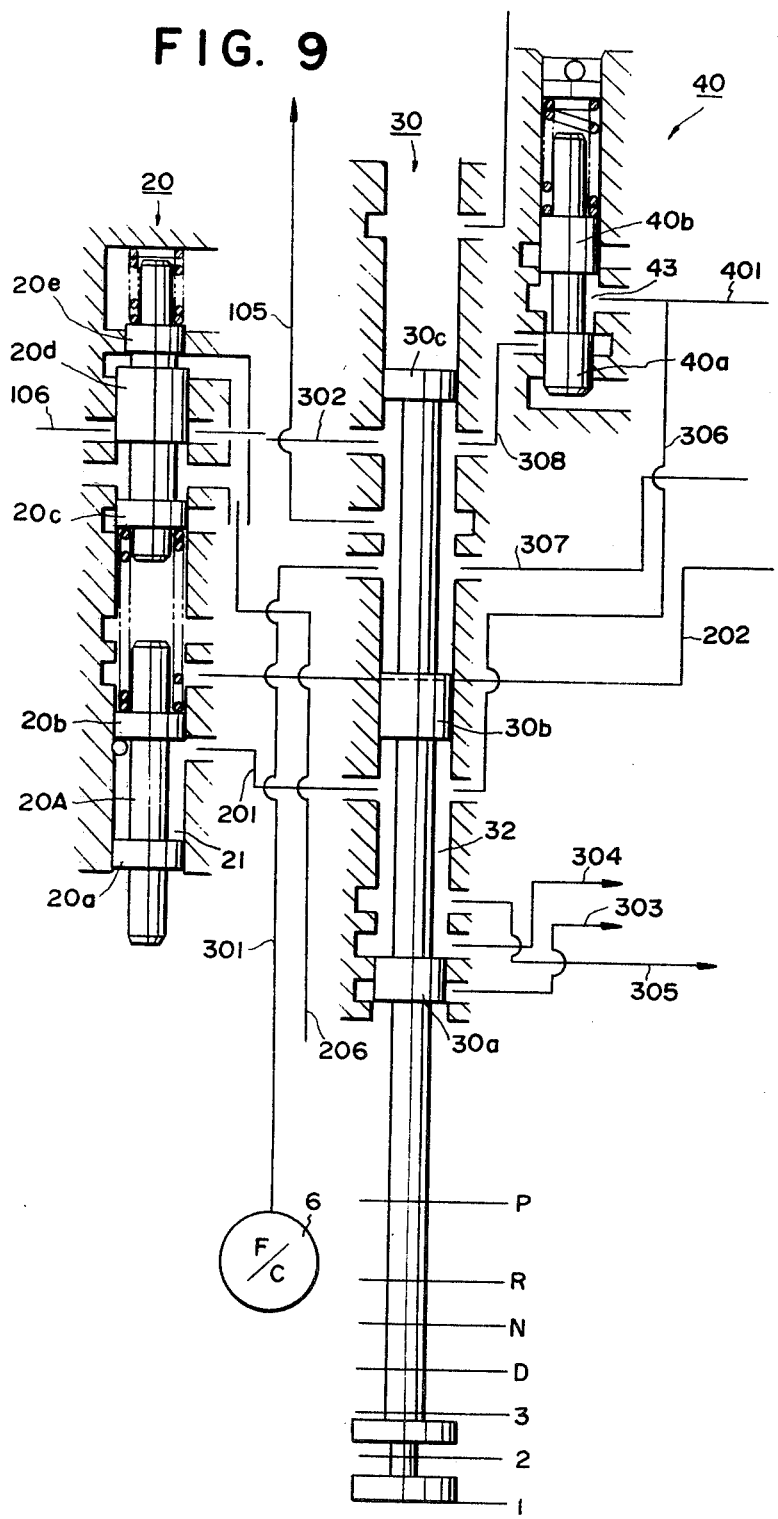

As shown in FIG. 9, the line pressure $P_L$ is supplied from the passage 302 to the passages 105, 301, 307 and 308, while the detent pressure is supplied from the passage 306 to the passages 304, 305 and 201. From the passages 304, 305 and 201 just mentioned, the detent pressure is further led to the chamber 81 of the 2-3 shift valve 80, chamber 1001 of the 3-4 shift valve 1000, and chamber 21 of the throttle valve 20, respectively.

Range 1

The range 1 maintains the transmission in the first speed ratio alone, where the front clutch 6 and the first brake 106' are in the engaged state as in the first speed operation of the range D.

Figure 10:
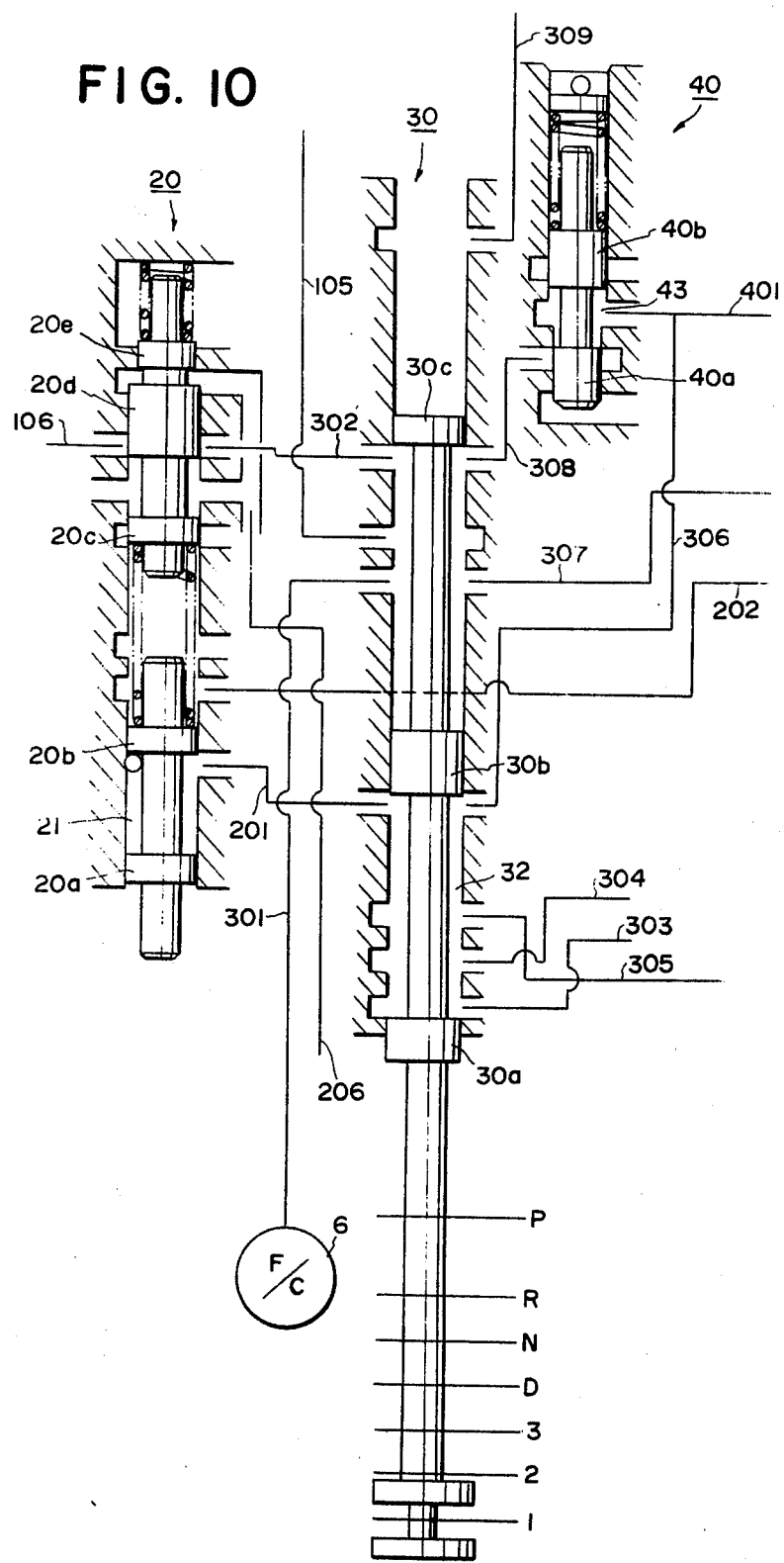

As particularly shown in FIG. 10, the line pressure $P_L$ is under the same conditions as in the range 3 described hereinbefore, but the detent pressure is supplied to the chamber 61 of the 1-2 shift valve 60, chamber 81 of the 2-3 shift valve 80 and chamber 1001 of the 3-4 shift valve 1000 through the passages 303, 304 and 305, respectively, to disable upshift to the second or upper speed ratio.

Kick-down

At the time of kick-down with the accelerator pedal (not shown) fully depressed, the throttle valve 20 which is linked to the accelerator pedal is moved upwardly against the action of the springs 23 and 28. As a result, the fluid passage 306 is put into communication with the passages 201 and 202, with the chamber 63 of the 1-2 shift valve 60, with the chamber 83 of the 2-3 shift valve 80 through the throttle modulator valve 70 and then with the chamber 1005 of the 3-4 shift valve 1000 for a downshift.

The table below shows the conditions of the various friction elements in relation with the different operation ranges, wherein "0" indicates that the friction element is on.

| Range | Friction Elements | Front Clutch | Rear Clutch | First Brake | Second Brake | Third Brake | Reverse Brake | One-Way Clutch |
|---|---|---|---|---|---|---|---|---|
| Range D | 1st | 0 | — | 0 | — | — | — | 0 |
|  | 2nd | 0 | — | — | 0 | — | — | — |
|  | 3rd | 0 | — | — | — | 0 | — | — |
|  | 4th | 0 | 0 | — | — | — | — | — |
| N (Neutral) |  | — | — | 0 | — | — | — | — |
| R (Reverse) |  | — | 0 | 0 | — | — | 0 | — |
| P (Parking) |  | — | — | — | — | — | — | — |
| Range 1 |  | 0 | — | 0 | — | — | — | 0 |

Gear Train Construction

Figure 11:
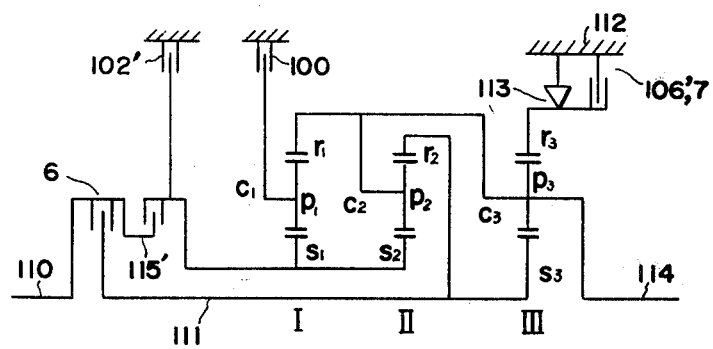
FIG. 11 is a diagrammatic view showing by way of example a gear train to which the device of the invention can be applied.

FIG. 11 shows by way of example a gear train to which the pressure control system of the invention can be applied, including the various friction elements as shown in the table above.

Referring to FIG. 11, the gear train includes three simple planetary gear units I, II and III each having a sun gear, a pinion and a ring gear. The sun gear $s3$ of the third planetary gear unit III and the input shaft 110 are connected by the front clutch 6 through the intermediate shaft 111. The sun gear $s3$ is meshed with the pinion $p3$ which in turn is meshed with the ring gear $r3$. Between the ring gear $r3$ and a casing 112, there are provided a clutch 113, a first brake 106' which is applied in the first speed operation, and a reverse brake 7 which is applied in the reverse operation. The pinion $p3$ is rotatably supported on a carrier $c3$ which is connected to a ring gear $r1$ of the first planetary gear unit I, to a carrier $c2$ of the second planetary gear unit II and also to an output shaft 114 of the transmission.

The ring gear $r2$ of the second planetary gear unit II is connected to the sun gear s3 of the third planetary gear unit III and meshed with a pinion $p2$ which is rotatably supported on a carrier $c2$. The pinion $p2$ is meshed with a sun gear $s2$ which is connected, together with the sun gear $s1$ of the first planetary gear unit I, to the input shaft 110 of the transmission through a rear clutch 115'.

The pinion $p1$ of the first planetary gear unit I is rotatably supported on a carrier $c1$, which carrier $c1$ is held stationary by a second brake 100 in the second speed. The sun gears $s1$ and $s2$ are held stationary by a third brake 102' in the third speed operation.

Operation of Gear Train

In the first speed operation of the range D, the front clutch 6 is engaged and the power of the input shaft 110 is transmitted to the sun gear $s3$ of the third planetary gear unit III through the intermediate shaft 111. Since the ring gear $r3$ tends to be rotated in a direction opposite to the direction of rotation of the input shaft 110, the one-way clutch 113 is locked and the first brake 106' is engaged to hold the ring gear $r3$ stationary, with the result that the carrier $c3$ is rotated at a reduced speed to provide a torque of the first speed at the output shaft 114.

In the second speed operation of the range D, the second brake 100 is applied to hold stationary the carrier $c1$, so that the power reduced by the first planetary gear unit I is transmitted to the output shaft 114 to provide thereat a torque of the second speed which is higher than the first speed.

In the third speed operation of the range D, the third brake 102 is applied to hold the sun gears s1 and s2 stationary. The power reduced by the second planetary gear unit II is transmitted to the output shaft 114 to impart thereto a torque of the third speed having a more increased speed than the second.

In the fourth speed operation of the range D, the front clutch 6 and the rear clutch are applied simultaneously, so that the whole assembly of the planetary gear units, I, II and III are rotated integrally and the torque of the input shaft 110 is transmitted directly to the output shaft 114 without reductions.

In the range N (neutral), both the front clutch 6 and the rear clutch 115' are released and therefore the torque of the input shaft 110 is not transmitted to the output shaft 114.

In the range R (reverse), the rear clutch 115' is applied to transmit the torque of the input shaft 110 to the sun gears s1 and s2 and the sun gear s3 and the carrier c3 are driven in a direction opposite to that of the input torque, through the pinion gear p2 and ring gear r2. Since the reverse brake 7 is applied, the ring gear r3 is held stationary and therefore a reverse torque is imparted to the carrier c3.

In the operation of the range 1 (directed exclusively to the first speed ratio), the first brake 106' is applied to have engine braking effects.

The change gear ratios for the respective speeds are as follows:

1st $\quad \dfrac{n_o}{n_i} = \dfrac{1}{1+\dfrac{1}{p_3}}$

2nd $\quad \dfrac{n_o}{n_i} = \dfrac{1}{1+p_2+\dfrac{p_2}{p_1}}$

3rd $\quad \dfrac{n_o}{n_i} = \dfrac{1}{1+p_2}$

4th $\quad \dfrac{n_o}{n_i} = 1$

Reverse $\quad \dfrac{n_o}{n_i} = -\dfrac{1}{\dfrac{1}{p_2 p_3}-1}$ wherein
$n_i$ : speed of input shaft 110;
$n_o$ : speed of output shaft 114;

$p_1 : \dfrac{\text{number of teeth of sun gear s1}}{\text{number of teeth of ring gear r1}}$;

$p_2 : \dfrac{\text{number of teeth of sun gear s2}}{\text{number of teeth of ring gear r2}}$; and $p_3 : \dfrac{\text{number of teeth of sun gear s3}}{\text{number of teeth of ring gear r3}}$.

The above specific embodiment of the invention is illustrative of the invention and may be modified within the scope of the appended claims.

We claim:

1. An improvement in an automatic transmission for a motor vehicle which includes a fluid pressure control system for selectively actuating a plurality of hydraulically controlled friction elements to establish predetermined speed reduction ratios in a number of different modes of operation, said control system comprising (a) a throttle valve adopted to produce a throttle pressure proportional to the engine throttle opening, (b) a manual valve movable to a number of positions including ranges P (parking), R (reverse), N (neutral), and other positions of a manual range within predetermined transmission ratios, (c) a governor valve for producing a governor pressure proportional to the speed of the vehicle, (d) a number of shift valves for automatically actuating said friction elements in response to throttle opening, vehicle speed and position of said manual valve, (e) pressurized fluid source for producing a line pressure, and (f) passage means for defining a plurality of predetermined fluid passages for interconnecting said valves and said hydraulically actuated friction elements with each other and with said source of pressurized fluid according to the position of said manual valve, wherein the improvement comprises:
a pressurized regulator valve adapted to regulate said line pressure into a constant detent pressure and to communicate with said shift valves through said manual valve to hold upshifting movements of said shift valves according to the position of said manual valve in said manual range, said shift valves including kickdown passages in communication therewith, said pressure regulator valve being further adapted to communicate with said kickdown passages through said throttle valve to urge downshifts of said shift valves on kickdown.

2. The fluid pressure control system as defined in claim 1, wherein said shift valves include 1–2 shift valve, 2–3 shift valve and 3–4 shift valve, said line pressure being supplied through said manual valve into said first pressure regulator valve to reduce said line pressure into a predetermined pressure therein, the reduced pressure being further supplied through said manual valve into said throttle valve so that said reduced pressure may be supplied through said kickdown passages into said 1–2 shift valve, said 2–3 shift valve and/or said 3–4 shift valve thereby to urge downshifts thereof at the time of kickdown.

3. The improvement in claim 2, wherein a pump is connected with said pressure regulator valve whereby said pressure regulator valve may regulate the pressure of the fluid supplied from said pump to generate said line pressure.

4. The improvement in claim 3, wherein said pressure regulator valve includes a first spool with four spaced valve lands, a second spool with two spaced valve lands, and a number of fluid chambers defined by and between said lands.

5. The improvement in claim 4, further comprising a fluid reservoir which communicates with one of said fluid chambers so as to serve as a drain chamber, the fluid taken from said fluid reservoir by said pump being supplied to another of said fluid chambers.

6. The improvement in claim 5, further comprising spring means which is inserted in one of said fluid chambers for urging one of said valve lands in a downward direction to reduce said line pressure to a predetermined level by the force of said spring means.

7. The improvement in claim 6, wherein the force tends to increase the output pressure of said pressure regulator valve is expressed by the following equation:
Pressure increasing force = force of said spring + difference between first and second ones of said lands × throttle pressure + said second land × said line pressure.

8. The improvement in claim 7, wherein said throttle valve includes a first spool valve with two spaced valve lands and a second valve spool with three spaced valve lands.

9. The improvement in claim 8, wherein said spring means is mounted in an oil chamber to urge said first valve spool of said throttle valve in a downward direction and said second valve spool thereof in an upward direction.

10. The improvement in claim 9, wherein the throttle pressure is generated at one of said fluid chambers in proportion to the throttle opening, by balancing two counteracting forces, or a pressure reducing force and a pressure increasing force which are expressed by the following equation:

Pressure reducing force = force of said spring means + difference between two lands of said throttle valve × the throttle pressure; and Pressure increasing force = force of said spring means (force urging said first valve spool of said throttle valve upwardly + force urging said first valve spool thereof downwardly, respectively).

11. The improvement in claim 10, wherein said manual valve includes three spaced valve lands.

12. The improvement in claim 11, wherein said manual valve is provided with a plurality of fluid chambers one of which is adapted to communicate with passages which are in fluid communication with said 1-2 shift valve, said 2-3 shift valve and said 3-4 shift valve, respectively.

13. The improvement in claim 12, wherein said first pressure regulator valve includes two spaced valve lands, two oil chambers for draining purposes, and a spring which is inserted in one of said oil chambers for the purpose of urging one of said valve lands of said first pressure regulator valve whereby said regulator valve may function to reduce the line pressure to a predetermined constant level and supply a detent pressure to suitable passages.

14. The improvement in claim 1, wherein said first pressure regulator valve includes first and second spaced valve lands and fluid passage interconnecting said first pressure regulator valve with said manual valve, said fluid passage communicating with a fluid chamber provided between some of said valve lands of said first pressure regulator valve whereby said second valve land of said manual valve may be adapted to cut the line pressure in the range P, and said fluid passage may be blocked by said first valve land of said manual valve in the range R while it may communicate with a fluid chamber provided between said second and first lands thereof in the range of N, D, "3", "2", and "1".

15. The improvement in claim 14, wherein said manual valve includes three spaced valve lands movable to positions corresponding to the ranges of P, R, N, D, "3", "2" and "1" in response to shift operation for distributing the line pressure to a predetermined fluid pressure supply passages.

16. The improvement in claim 15, wherein said first pressure regulator valve includes two spaced valve lands and five fluid chambers including two drain chambers, one of which fluid chambers has inserted thereinto spring means for urging one of said valve lands in a downward direction for reducing the line pressure to a predetermined constant level by the force of said spring means while supplying the detent pressure to other fluid passages.

* * * * *